United States Patent [19]
Bliss

[11] Patent Number: 5,479,762
[45] Date of Patent: Jan. 2, 1996

[54] CARRIER PUCK

[75] Inventor: Gary S. Bliss, Beavercreek, Ohio

[73] Assignee: Dowbrands L.P., Indianapolis, Ind.

[21] Appl. No.: 239,018

[22] Filed: May 6, 1994

[51] Int. Cl.⁶ ........................................... B65B 7/28
[52] U.S. Cl. ............................. 53/490; 53/331.5; 53/317
[58] Field of Search ................................. 279/22, 35, 106, 279/906; 53/317, 331.5, 334, 344, 354, 355, 356, 340, 490

[56] References Cited

U.S. PATENT DOCUMENTS

| | | |
|---|---|---|
| 2,213,626 | 3/1939 | Curtin et al. ................................ 53/355 |
| 2,936,059 | 5/1960 | Hakogi . |
| 3,342,304 | 9/1967 | Greulich . |
| 3,805,488 | 4/1974 | Holstein ................................ 53/331.5 |
| 3,819,194 | 6/1974 | Grevich et al. . |
| 3,941,237 | 3/1976 | MacGregor, Jr. . |
| 4,114,511 | 9/1978 | Patenaude . |
| 4,263,837 | 4/1981 | Tassie . |
| 4,533,038 | 8/1985 | Richard . |
| 4,662,153 | 5/1987 | Wozniak ................................ 53/317 |
| 4,807,421 | 2/1989 | Araki et al. . |
| 5,119,549 | 6/1992 | Foote, Jr. et al. ......................... 53/284 |
| 5,183,368 | 2/1993 | Douard . |
| 5,207,048 | 5/1993 | Wysocki ................................ 53/331.5 |

FOREIGN PATENT DOCUMENTS 1059147  3/1954  France .

Primary Examiner—John Sipos
Assistant Examiner—Gene L. Kim

[57] ABSTRACT

A puck is provided for releasably gripping a closure element to be moved along a predetermined path and mated to a container. The puck includes a main body and a gripper assembly associated with the main body for releasably gripping the closure element. The gripper assembly comprises first and second opposing arms connected to the main body. The first arm has two first gripper members mounted thereto and the second arm has two second gripper members mounted thereto. The first and second arms are movable between a retracted position and a gripping position. The first gripper members are rotatable for effecting rotation of the closure element to permit the closure element to be mated to the container. The gripper assembly further includes first and second spring-biased support members connected to the first and second arms for movement between first and second positions. The first and second support members define a shelf when positioned in the first position for supporting the closure element when the closure element comprises a cap and is movable to the second position by the closure element when the closure element comprises a sprayer head.

17 Claims, 8 Drawing Sheets

CARRIER PUCK

BACKGROUND OF THE INVENTION

The present invention relates to carrier pucks for releasably gripping objects to be moved along a predetermined path and, more particularly, to carrier pucks for releasably gripping closure elements of varying shapes and sizes, transporting those closure elements along a processing line and effecting rotation of the closure elements to permit the closure elements to be mated to containers.

Carrier pucks are common in the prior art. Such pucks are used to receive, support and convey articles having unusual shapes, such as closure elements to be mated to containers. Such elements comprise sprayer heads, flat caps and push/pull dispensing caps. Carrier pucks for receiving and supporting closure elements have typically been designed to receive and support only a single closure element type. When a different closure element type is to be utilized, line changeover must occur. This typically involves modifying the processing apparatus along the processing line. This, however, is costly due to, among other things, production line downtime and the expense of additional pucks.

Before being mated to a container, closure elements may receive one or more of the following items: gaskets, dip tubes, adhesives and sealants. The closure elements are commonly transported by carrier pucks to assembly stations where they receive these items. After these assembly steps have been completed, the closure elements are removed from their respective pucks and transferred to support devices provided on a capping machine where the closure elements are mated to containers. Requiring movement of the closure elements from the pucks to the capping machine requires additional part handling which adds to the expense of manufacturing the final product. Requiring both carrier pucks and capping machine support devices to transport the closure elements during manufacturing is costly due to the expense of providing two sets of carrier parts. These expenses are multiplied when separate sets of carrier parts must be provided for a plurality of different closure elements.

Accordingly, there is a need for an improved carrier puck which is capable of releasably gripping closure elements of varying shapes and sizes. There is further a need for an improved carrier puck which is capable of transporting closure elements along a processing line and effecting rotation of each of the closure elements to permit those closure elements to be mated to containers.

SUMMARY OF THE INVENTION

These needs are met by the present invention wherein a carrier puck is provided which is capable of releasably gripping any one of a number of different closure elements. After receiving a closure element, the puck transfers it along a packaging line. Each closure element received by the puck is positioned at generally the same location relative to processing machinery as it moves along the packaging line. The puck is also capable of acting as a chuck for effecting rotation of the closure element to permit the closure element to be mated to a container. Accordingly, the carrier puck of the present invention substantially reduces manufacturing costs by reducing production line downtime and eliminating the expenses associated with acquiring additional change parts.

In accordance with a first aspect of the present invention, a carrier puck is provided for releasably gripping a closure element to be moved along a predetermined path and mated to a container. The puck comprises a main body and a gripper assembly associated with the main body for releasably gripping the closure element. The gripper assembly includes at least one gripper member which is adapted to engage the closure element and is rotatable so as to effect rotation of the closure element to permit the closure element to be mated with the container.

The gripper assembly preferably comprises first and second opposing arms connected to the main body. The first arm has two first gripper members mounted thereto and the second arm has two second gripper members mounted thereto. The first and second arms are movable between a retracted position and a gripping position. The closure member is securely held between the first and second gripper members when the first and second gripper members are in the gripping position. Each of the first gripper members comprises a first roller rotatably mounted on the first arm and each of the second gripper members comprises a second roller rotatably mounted on the second arm.

The main body includes first and second bores. The first and second arms extend through these bores. The main body further includes an inner cavity defined by an inner side wall portion and an inner base wall portion of the main body.

The gripper assembly further includes first and second spring-biased support members connected to the first and second arms for movement between first and second positions. The first and second support members define a shelf when positioned in the first position for supporting the closure element when the closure element comprises either a flat cap or a push/pull dispensing cap and are movable to the second position by the closure element when the closure element comprises a sprayer head.

The gripper assembly also includes a spring positioned between the main body and the first and second arms for biasing the first and second arms in the gripping position.

In accordance with a second aspect of the present invention, a puck is provided for releasably gripping one of first and second articles, each having a different overall shape. The puck comprises a main body and a gripper assembly associated with the main body having first and second gripping elements movable toward and away from one another for releasably gripping one of the first and second articles.

The first gripping element comprises a first arm having two first gripper members mounted thereon and the second gripping element comprises a second arm having two second gripper members mounted thereon. Each of the first gripper members comprises a first roller rotatably mounted on the first arm and each of the second gripper members comprises a second roller rotatably mounted on the second arm.

In accordance with a third aspect of the present invention, a puck is provided for releasably gripping one of a cap and a first portion of a sprayer head. The puck comprises a main body having an inner cavity adapted to receive a second portion of the sprayer head and a gripper assembly associated with the main body having first and second gripping elements movable toward and away from one another for releasably gripping one of the cap and the first portion of the sprayer head.

The first gripping element comprises a first arm having two first gripper members mounted thereon and the second gripping element comprises a second arm having two second gripper members mounted thereon. Each of the first gripper members comprises a first roller rotatably mounted on the first arm and each of the second gripper members comprises a second roller rotatably mounted on the second arm. The inner cavity is defined by an inner side wall portion and an inner base wall portion of the main body. The gripper assembly further includes first and second support members connected to the first and second gripping elements.

In accordance with a fourth aspect of the present invention, a method is provided for mating a closure element to a container. The method comprises the steps of: gripping a closure element on its outer surface with gripper members; rotating at least one of the gripper members to effect the rotation of the closure element; and, thereafter, engaging a container with the rotating closure element to effect the mating of the closure element with the container.

It is an object of the present invention to provide a carrier puck for releasably gripping closure elements of varying shapes and sizes. It is a further object of the present invention to provide a carrier puck for transporting closure elements along a processing line and effecting rotation of the closure elements to permit the closure elements to be mated to containers. It is another object of the present invention to provide a method for mating a closure element to a container such that the closure element is caused to rotate before the container engages therewith. It is yet another object of the present invention to provide a puck which serves to transport closure elements along a predetermined path and further serves as a chuck for rotating closure elements to allow same to be mated to containers. These and other objects and advantages of the present invention will be apparent from the following description, the accompanying drawings, and the appended claims.

DETAILED DESCRIPTION OF THE INVENTION

Figure 1:
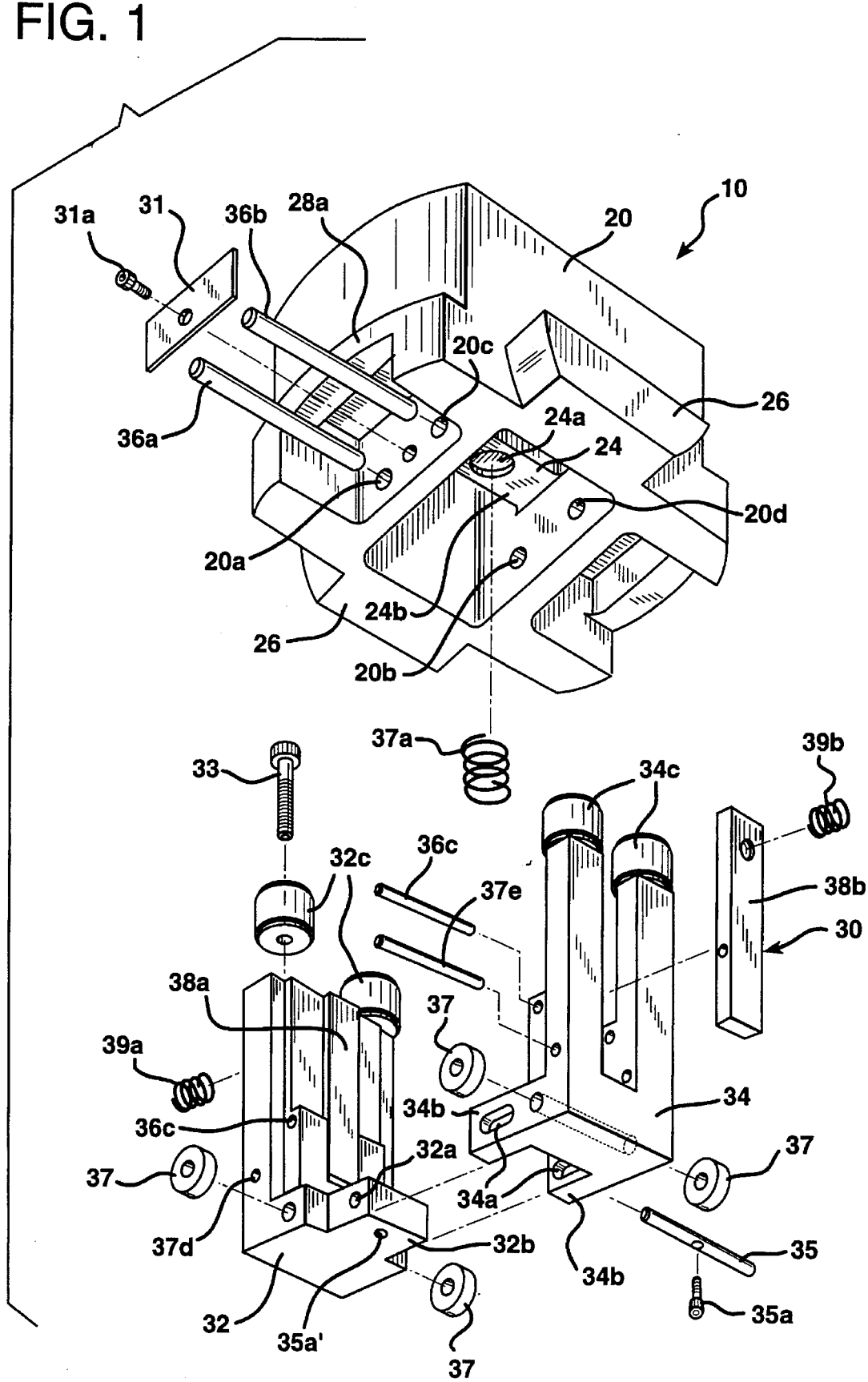
FIG. 1 is an exploded perspective view of a puck constructed in accordance with the present invention.

With reference to FIGS. 1–6, a carrier puck 10 formed in accordance with the present invention comprises a main body 20 and a gripper assembly 30. The gripper assembly 30 is connected to the main body 20 and serves to releasably grip a closure element 50 such that the puck 10 can transport the closure element 50 along a predetermined path. The gripper assembly 30 also serves to effect rotation of the closure element 50 to permit the closure element 50 to be mated to a container 52, see FIG. 13. The closure element 50 may comprise a flat cap 50a, a push/pull dispensing cap 50b, a spray head 50c, see FIG. 13, or other like element.

The main body 20 is formed from a polymeric material, such as polyvinyl chloride or ultra high molecular weight polyethylene. It may also be formed from a metal, wood or other rigid material. The main body 20 includes first and second bores 22a and 22b which are separated from one another by a center rib 24. The main body 20 further includes laterally extending ears 26 and front and rear flanges 28a and 28b.

The gripper assembly 30 comprises first and second opposing arms 32 and 34 which extend through the first and second bores 22a and 22b, see FIGS. 1, 2, 5 and 7. In the illustrated embodiment, the first and second arms 32 and 34 are formed from a metal such as stainless steel or aluminum. A pin 35 extends through enlarged openings 34a in lower opposing portions 34b of the second arm 34 and further extends through a bore 32a provided in a lower central portion 32b of the first arm 32 to pivotably connect the first and second arms 32 and 34 to one another. The pin 35 is maintained in the bore 32a by a bolt 35a which passes through a bore 35a' provided in the central portion 32b.

The arms 32 and 34 are pivotably connected to the main body 20 via pins 36a and 36b. Pin 36a extends through first and second openings 20a and 20b formed in the main body 20. The second opening 20b is stepped to provide a stop for the pin 36a to prevent it from passing completely through the opening 20b, see FIG. 5. The pin 36b extends through third and fourth openings 20c and 20d in the main body 20. The fourth opening 20d is stepped to provide a stop for the pin 36b. The pins 36a and 36b extend through washers 37 which are interposed between the main body 20 and the first and second arms 32 and 34, see FIGS. 1 and 5. A face plate 31 covers the openings 20a and 20c to maintain the pins 36a and 36b properly positioned in the main body 20. The face plate 31 is connected to the main body 20 via a threaded fastener 31a.

A spring 37a is interposed between the center rib 24 and the central portion 32b of the first arm 32 for biasing the first and second arms 32 and 34 toward one another. A recess 24a is provided on the lower surface 24b of the rib for receiving an end portion of the spring 37a, see FIG. 1. A similar recess may also be provided on the upper surface of the central portion 32b.

Figure 8:
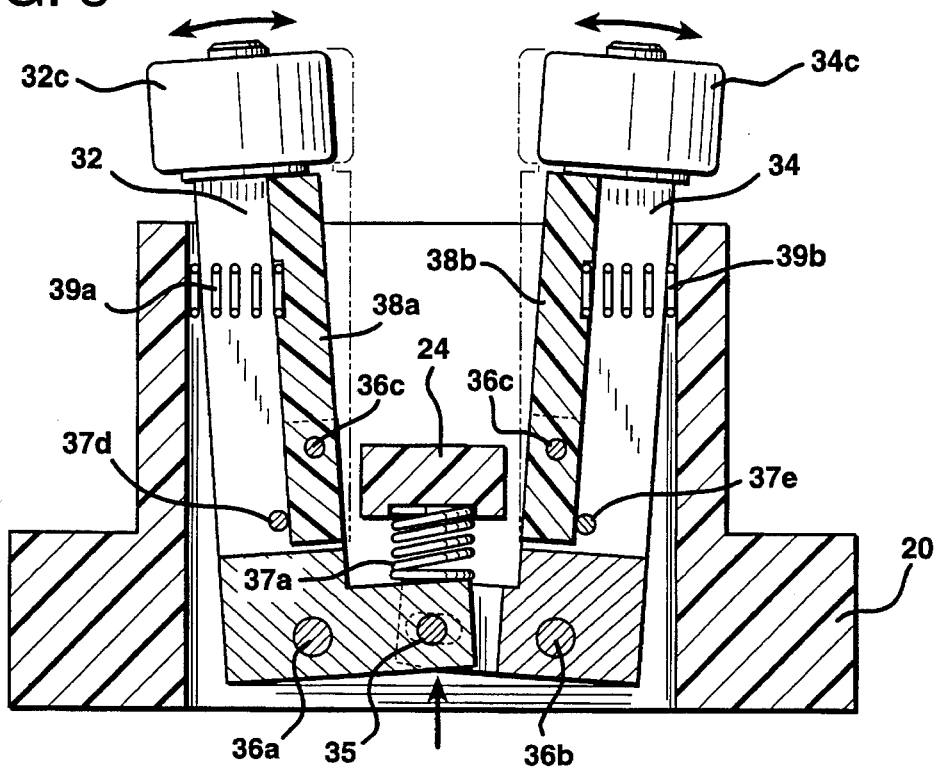
FIG. 8 is a sectional view similar to FIG. 7 with the first and second arms separated to receive a closure element.
Figure 9:
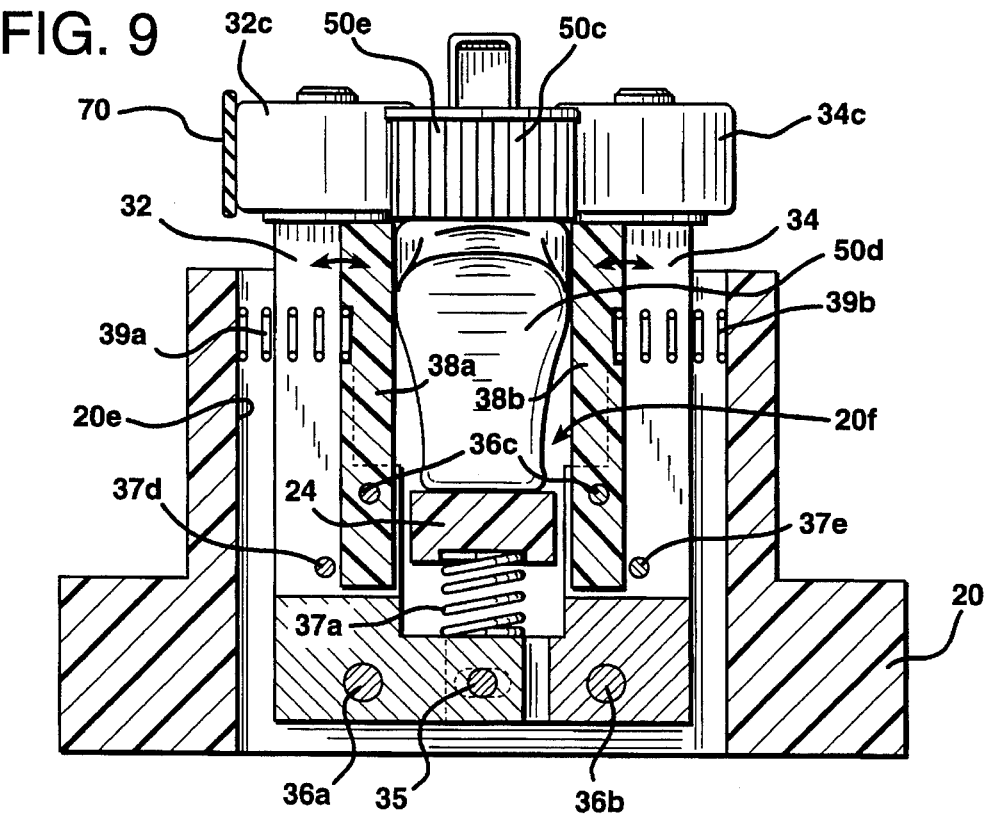
FIG. 9 is a sectional view similar to FIG. 7 with a sprayer head positioned between the first and second gripper members.

The first arm 32 has two first gripper members 32c rotatably mounted thereon and the second arm 34 has two second gripper members 34c rotatably mounted thereon. The first and second gripper members 32c and 34c are preferably rollers formed from a polymeric material such as polyurethane. The gripper members 32c and 34c are secured to the arms 32 and 34 by bolts 33 or other like fasteners. The first and second arms 32 and 34 are movable between a retracted position, shown in FIG. 8, and a gripping position, shown in FIGS. 2, 7 and 9.

Figure 7:
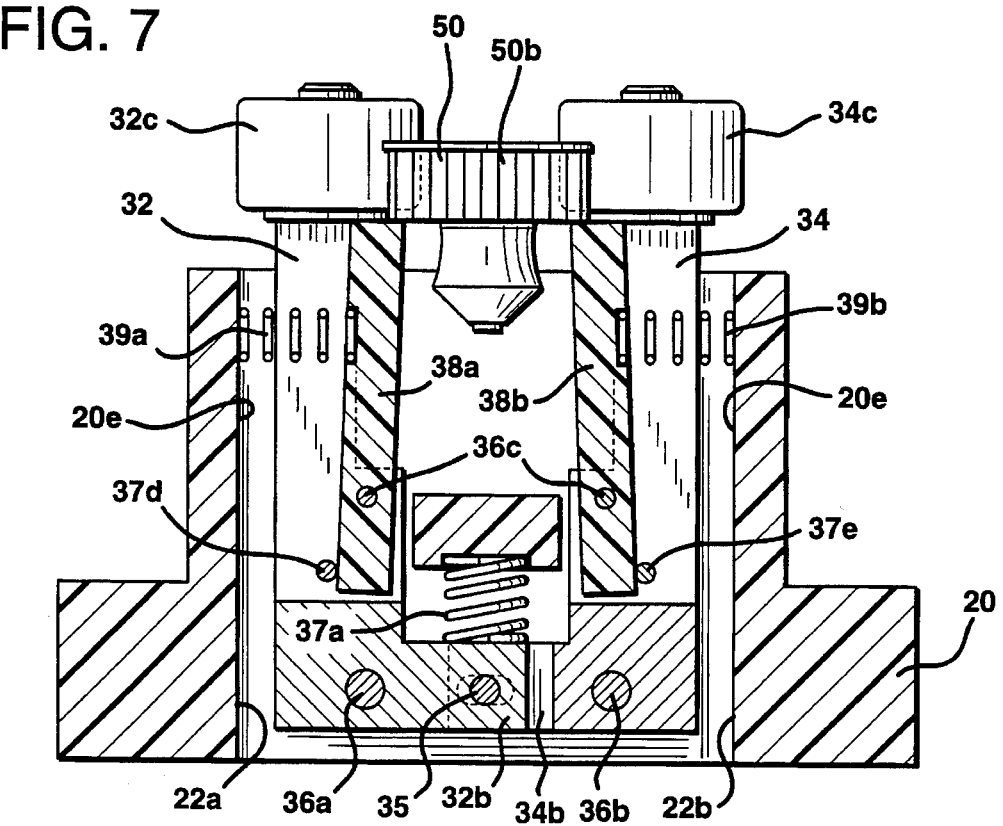
FIG. 7 is a sectional view along view line 7—7 in FIG. 2.

The gripper assembly 30 further includes first and second spring-biased support members 38a and 38b which are pivotably connected to the first and second arms 32 and 34 by pins 36c, see FIGS. 1 and 7. A first spring 39a is interposed between an inner side wall portion 20e of the main body 20 and the first support member 38a for biasing the first support member 38a in a direction away from the inner side wall portion 20e. A first stop pin 37d is connected to the main body 20 for limiting the pivotable movement of the first support member 38a, see FIG. 7. A second spring 39b is positioned between the inner side wall portion 20e and the second support member 38b for biasing the second support member 38b in a direction away from the inner side wall portion 20e. A second stop pin 37e is connected to the main body 20 to limit the pivotable movement of the second support member 38b.

The first and second support members 38a and 38b are movable between first and second positions. When in the first position, the first and second support members 38a and 38b define a shelf for supporting the closure element 50 when the closure element 50 comprises either a flat cap 50a, see FIG. 2, or a push/pull dispensing cap 50b, see FIG. 7. The first and second support members 38a and 38b are movable to the second position by the closure element 50 when the closure element 50 comprises a sprayer head 50c, see FIG. 9.

Figure 2:
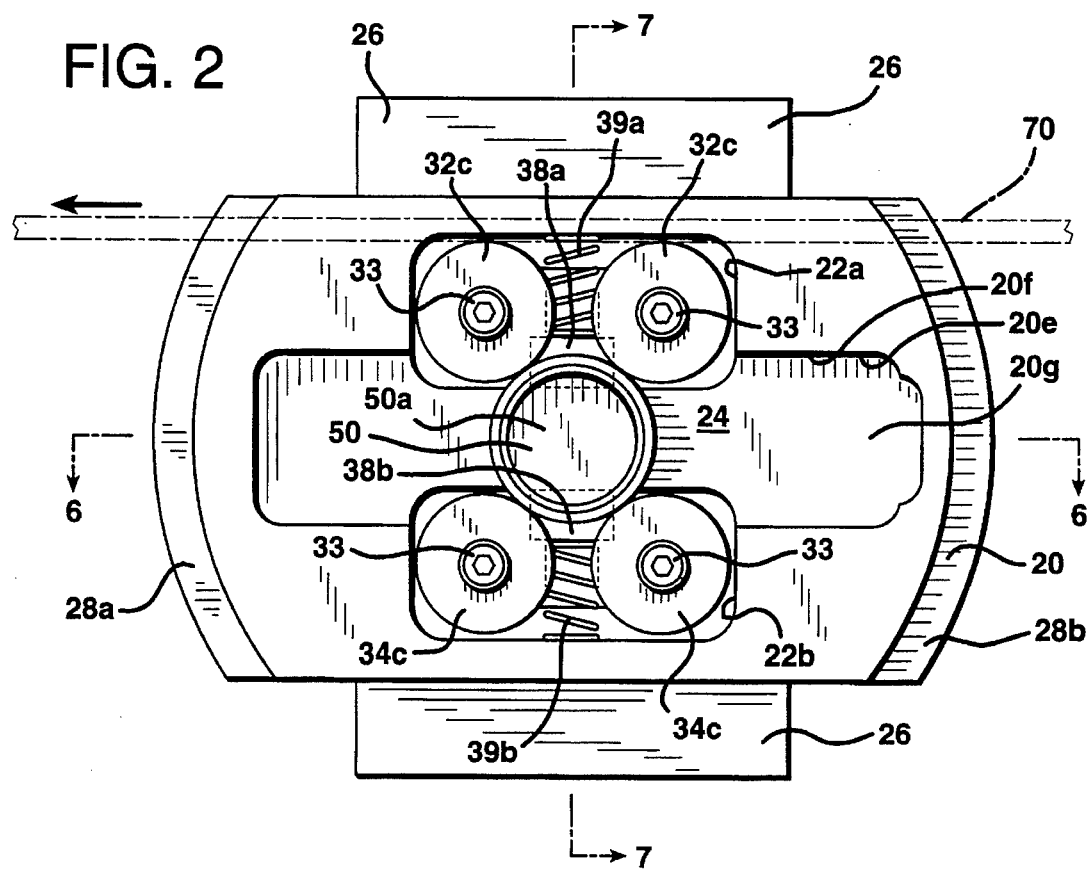
FIG. 2 is a top plan view of the puck in FIG. 1.
Figure 3:
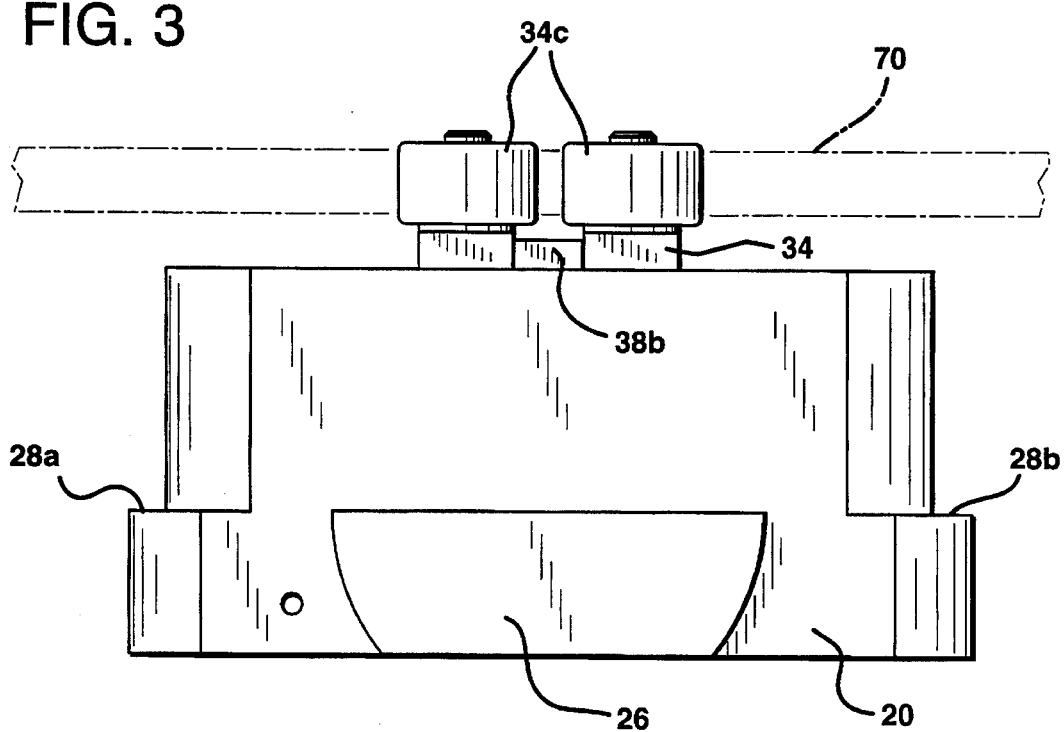
FIG. 3 is a side view of the puck in FIG. 1.
Figure 4:
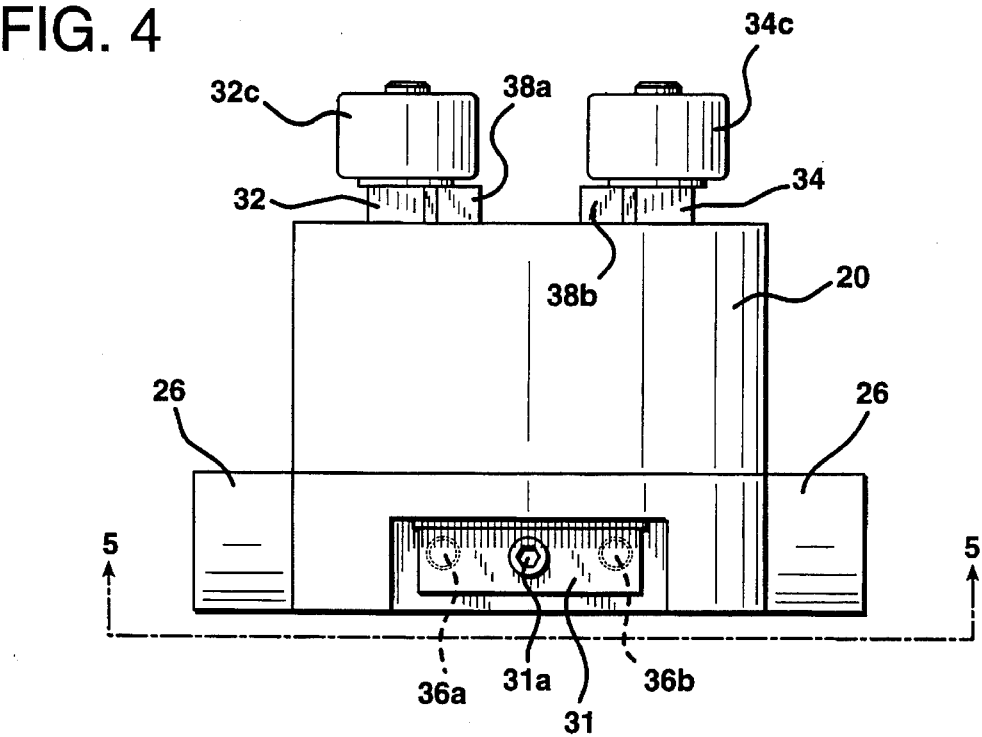
FIG. 4 is an end view of the puck shown in FIG. 1.
Figure 5:
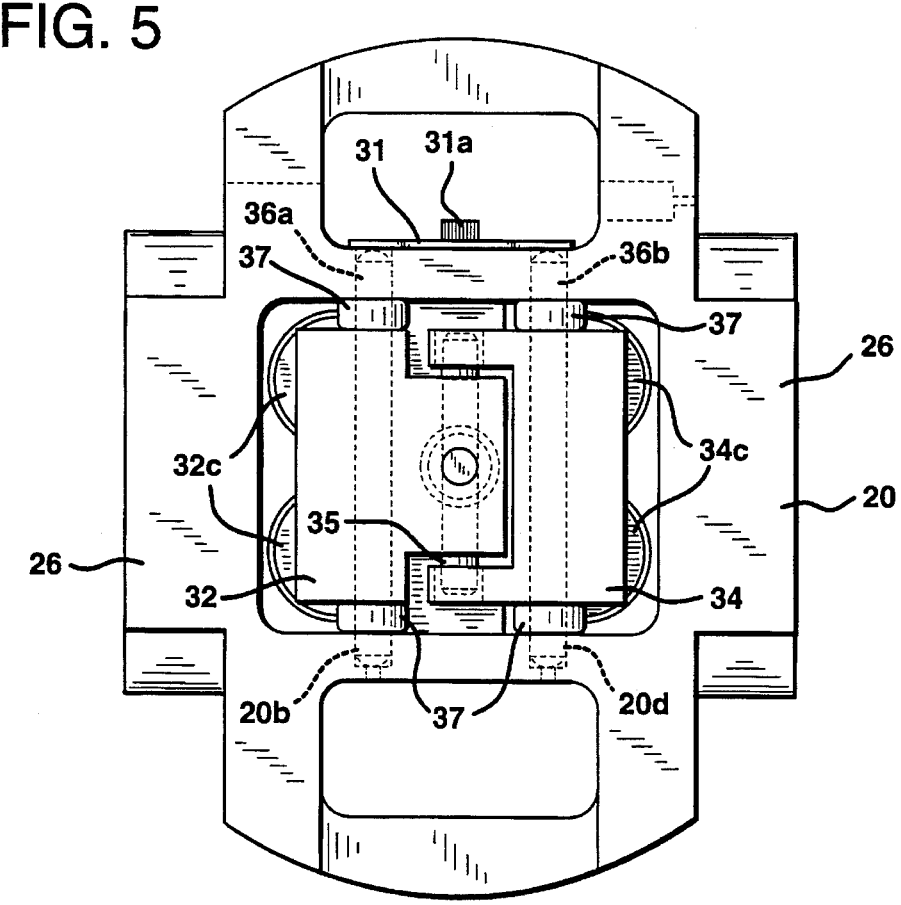
FIG. 5 is a view taken along line 5—5 in FIG. 4.
Figure 6:
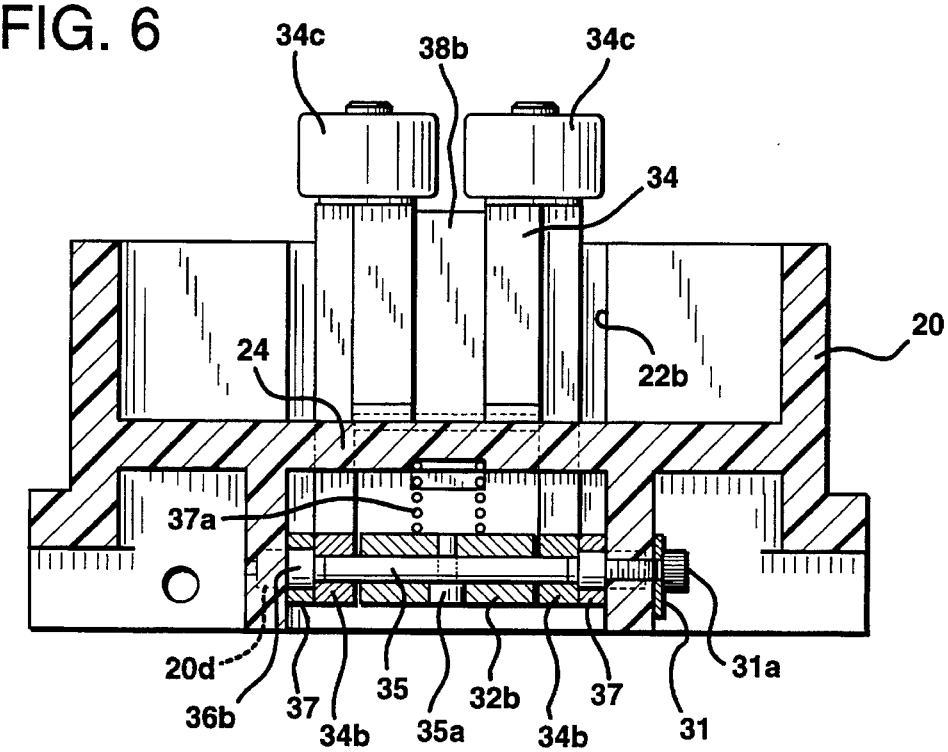
FIG. 6 is a sectional view along view line 6—6 in FIG. 2.

The main body 20 further includes an inner cavity 20f defined by the inner side wall portion 20e and an inner base wall portion 20g, see FIG. 2. The inner cavity 20f is configured such that it will receive the lower portion 50d of the sprayer head 50c when the upper cap portion 50e is engaged by the gripper members 32c and 34c, see FIG. 9. It should be apparent that the puck 10 of the present invention is capable of accommodating a number of different closure elements 50, each having a different shape.

Figure 10:
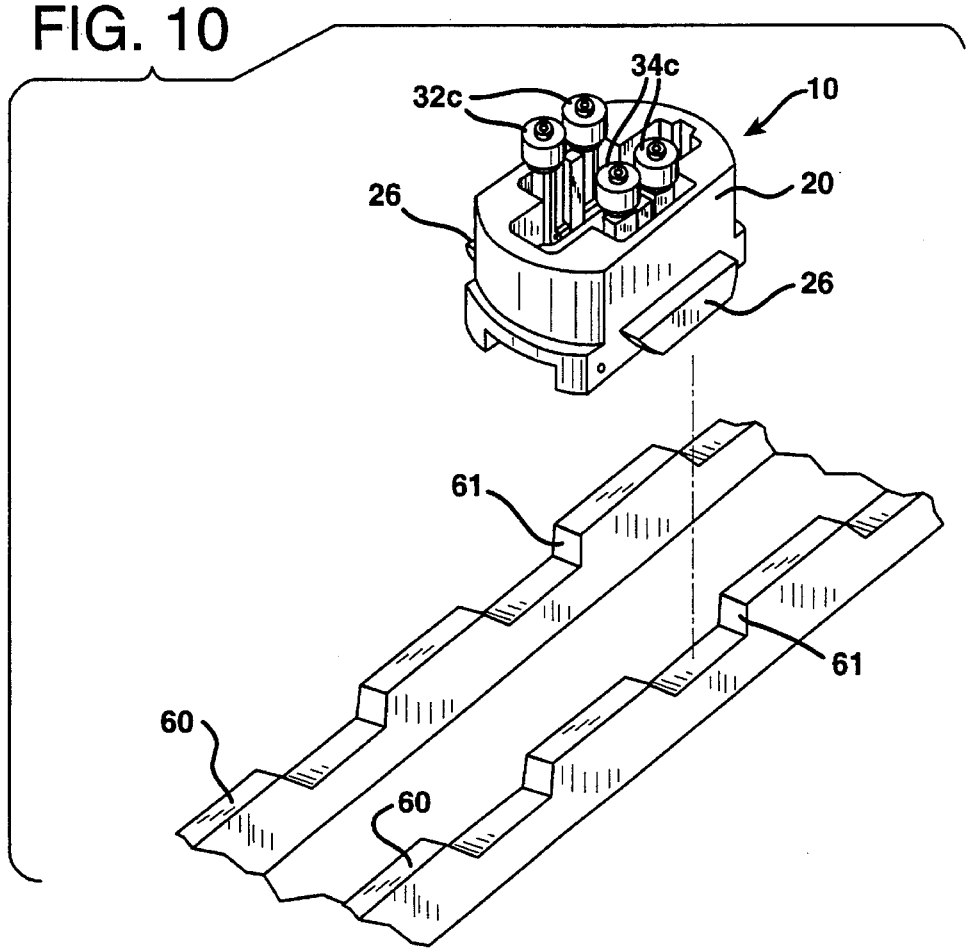
FIG. 10 is a perspective view showing a puck of the present invention separated from a conveyor for transporting the puck along a predetermined path.

Use of the puck 10 to transport a closure element 50 along a processing line will now be described. Initially, the puck 10 is conveyed via a conveyor 60, see FIG. 10, to a closure loading turret (not shown). The conveyor 60 is provided with recesses 61 which receive and support the lateral ears 26 on the main body 20 of the puck 10. At the loading turret, the closure element 50, which may comprise either a flat cap 50a, a push/pull dispensing cap 50b or a sprayer head 50c, is received between the first and second gripper members 32c and 34c. Separation of the first and second arms 32 and 34 is effected via a piston (not shown) or like element which applies an actuating force to the bolt 35a associated with the first arm 32.

Figure 11:
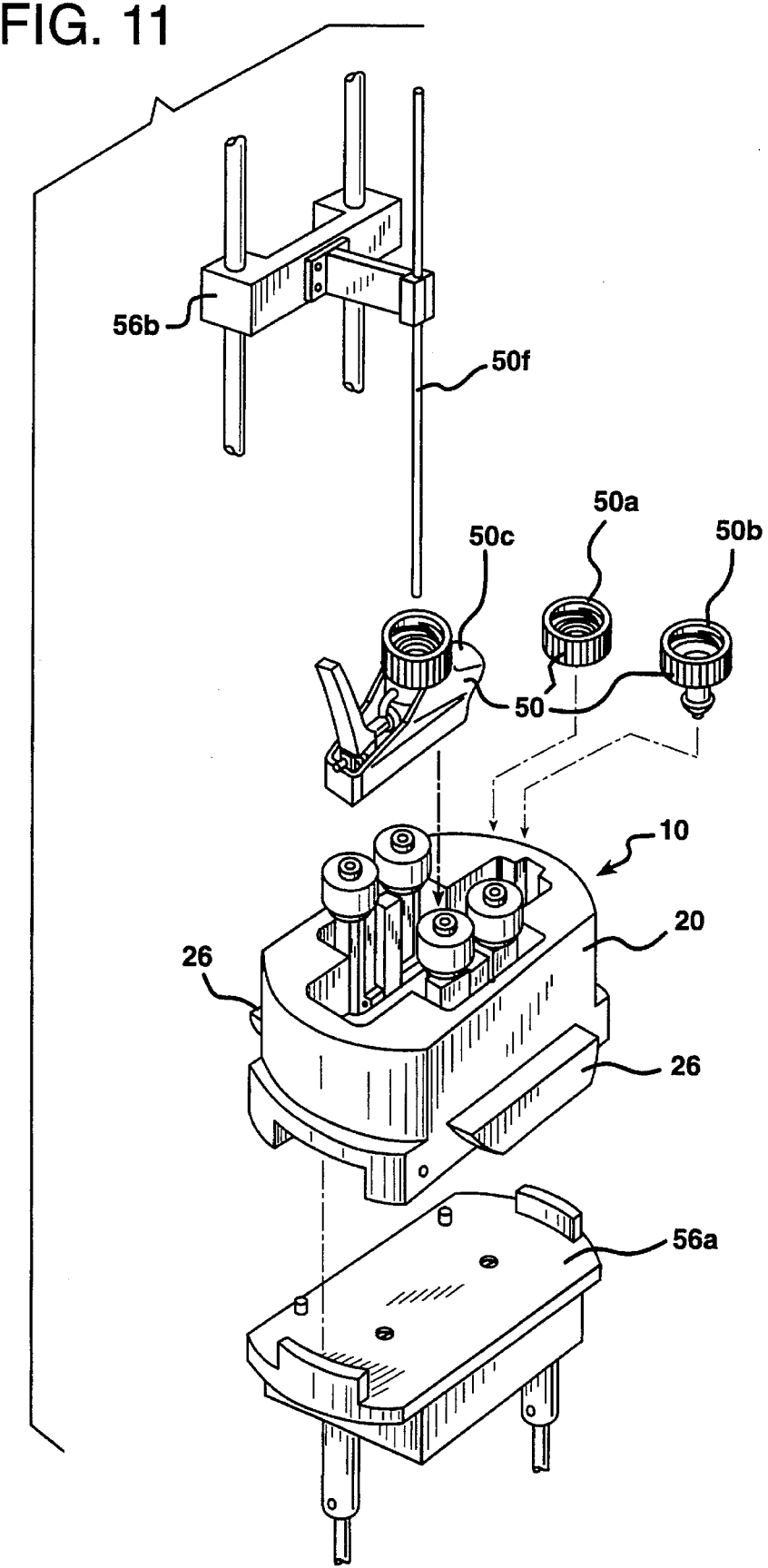
FIG. 11 is an exploded perspective view showing a puck of the present invention, a platen and a tube gripping element of a dip tube insertion turret.

Once the closure element 50 is received between the first and second gripper members 32c and 34c, the puck 10 is conveyed to one or more assembly stations via known conveyor devices (not shown). At these stations, closure elements 50 may receive sealants, adhesives, lubricants, gaskets, dip tubes and/or game pieces. In FIG. 11, a platen 56a for receiving the puck 10 is shown positioned below a tube gripping element 56b. The platen 56a and the tube gripping element 56b form part of a dip tube insertion turret. At this station, the dip tube 50f is inserted into the sprayer head 50c.

Figure 12:
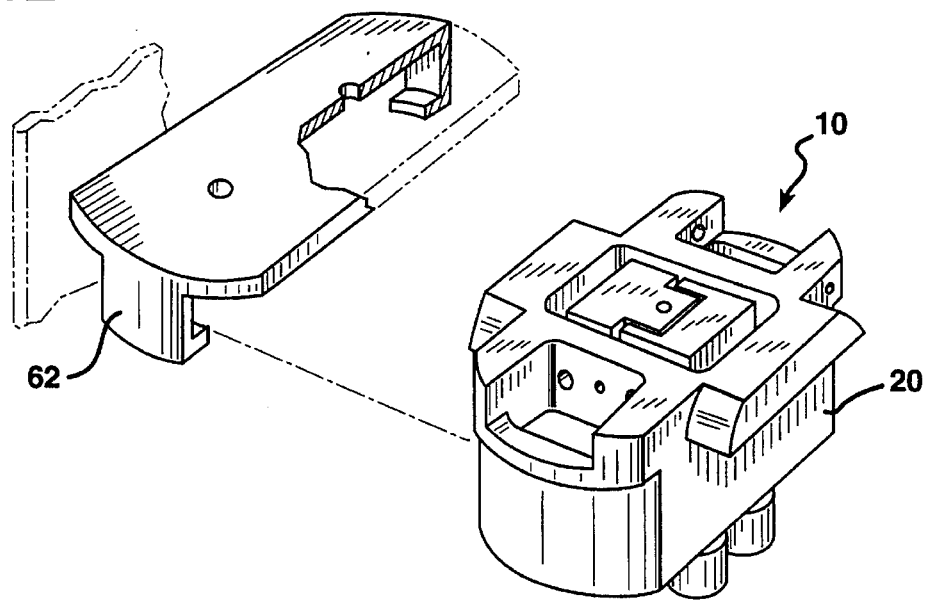
FIG. 12 is a perspective view showing a puck receiving element forming part of a closure/container assembly turret and puck before being received in the receiving element.
Figure 13:
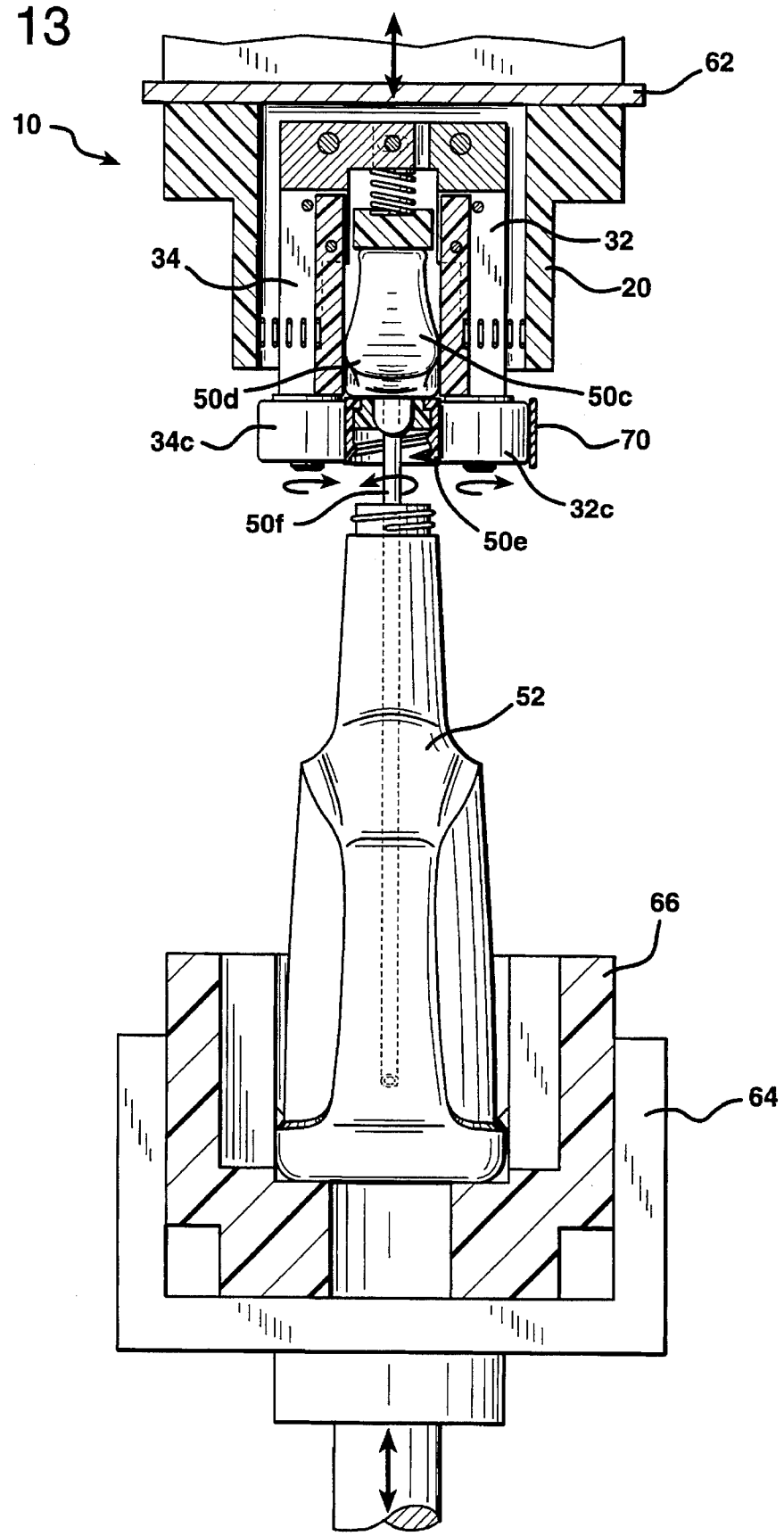
FIG. 13 is a view, partially in section, of a puck positioned within a receiving element of the closure/container assembly turret and a container carrier puck supporting a container.

After assembly of the closure element 50 has been completed, the puck 10 is conveyed via a known conveyor device (not shown) to a closure/container assembly turret. This turret is provided with a plurality of puck receiving elements 62, see FIGS. 12 and 13, which support the pucks 10 on the turret. Positioned below the receiving elements 62 are a plurality of reciprocating members 64 which receive and support container carrier pucks 66. In FIG. 13, a single reciprocating member 64 is shown supporting a container carrier puck 66 which, in turn, supports the container 52.

The first gripper members 32c are rotatable for effecting rotation of the closure element 50 to permit the closure element 50 to threadedly engage with the container 52. Rotation of the first gripper members 32c is effected via a belt 70 located below the receiving elements 62, see FIGS. 2 and 10. After rotation of the closure element 50 has been initiated, the reciprocating member 64 is elevated to permit the closure element 50 to mate with the container 52. Since the closure element 50 is rotating before the container 52 engages the closure element 50, risk of cross-threading is substantially reduced. After mating has occurred, the first and second arms 32 and 34 are separated via a piston (not shown) or like element which applies an actuating force to the bolt 35a associated with the first arm 32. Separation of the first and second arms 32 and 34 allows the gripper members 32c and 34c to release the closure element 50. The puck 10 is then returned by a known conveying device (not shown) to the conveyor 60 where the cycle starts over.

Thus, it will be apparent that the puck 10 of the present invention functions as a device for transporting a closure element between various assembly stations and also acts as a chuck for rotating the closure element to allow it to be mated to a container. The puck 10 is also capable of receiving and gripping a number of different closure element types, e.g., a flat cap 50a, a push/pull dispensing cap 50b, a sprayer head 50c or other like closure element.

Having described the invention in detail and by reference to preferred embodiments thereof, it will be apparent that modifications and variations are possible without departing from the scope of the invention defined in the appended claims. For example, it is further contemplated by the present invention that a bar code or other identification means may be provided on the puck 10 for tracking purposes. It is also contemplated by the present invention that the puck 10 may receive and support parts other than closure elements. It is further contemplated by the present invention that the gripper members may be provided with one or more O-rings (not shown) to allow for improved gripping of closure elements.

What is claimed is:

1. A puck for releasably gripping a closure element to be moved along a predetermined path and mated to a container in combination with drive apparatus, said puck comprising:

a main body adapted to be moved by a transport device along said predetermined path; and a gripper assembly associated with said main body for releasably gripping said closure element prior to and during mating with said container, said gripper assembly including at least one support arm having at least one gripper member rotatably mounted thereon for engaging said closure element and being rotatable independently of said support arm and driven by the drive apparatus relative to said support arm so as to effect rotation of said closure element to permit said closure element to mate with said container.

2. A puck as set forth in claim 1, wherein said gripper assembly comprises first and second opposing support arms connected to said main body, said first arm having two first gripper members mounted thereto and said second arm having two second gripper members mounted thereto, said first and second arms being movable between a retracted position and a gripping position, said closure member being securely held between said first and second gripper members when said first and second gripper members are in said gripping position.

3. A puck as set forth in claim 2, wherein each of said first gripper members comprises a first roller rotatably mounted on said first arm and each of said second gripper members comprises a second roller rotatably mounted on said second arm.

4. A puck as set forth in claim 2, wherein said main body includes first and second bores, said first and second arms extending through said first and second bores.

5. A puck as set forth in claim 4, wherein said main body further includes an inner cavity defined by an inner side wall portion and an inner base wall portion of said main body.

6. A puck as set forth in claim 5, wherein said gripper assembly further includes first and second spring-biased support members connected to said first and second arms for movement between first and second positions, said first and second support members defining a shelf when positioned in said first position for supporting said closure element when said closure element comprises a cap and being movable to said second position by said closure element when said closure element comprises a sprayer head to stabilize said closure element within said main body.

7. A puck as set forth in claim 2, wherein said gripper assembly further includes a spring positioned between said main body and said first and second arms for biasing said first and second arms in said gripping position.

8. A puck for releasably gripping one of first and second articles to be mated to a container in combination with drive apparatus, said first article having first dimensions and said second article having second dimensions which differ from said first dimensions, said puck comprising:

a main body adapted to be moved by a transport device along a predetermined path; and a gripper assembly associated with said main body having first and second gripping elements movable toward and away from one another for releasably gripping one of said first and second articles prior to and during mating with said container, said first gripping element comprising a first arm having at least one first rotatable gripper member and said second gripping element comprising a second arm having at least one second rotatable gripper member, one of said first and second rotatable gripper members being driven by the drive apparatus relative to its corresponding support arm so as to effect rotation of said one article to permit said one article to mate with said container, said first and second arms being pivotable toward and away from one another about respective first and second generally parallel axes, said first and second axes being generally perpendicular to axes of rotation of said first and second gripper members.

9. A puck as set forth in claim 8, wherein said first gripping element comprises two first gripper members and said second gripping element comprises two second gripper members.

10. A puck as set forth in claim 9, wherein each of said first gripper members comprises a first roller rotatably mounted on said first arm and each of said second gripper members comprises a second roller rotatably mounted on said second arm.

11. A puck as set forth in claim 9, wherein said main body includes first and second bores through which said first and second arms extend.

12. A puck as set forth in claim 11, wherein said main body further includes an inner cavity defined by an inner side wall portion and an inner base wall portion of said main body.

13. A puck for releasably gripping one of a cap and a first portion of a sprayer head, said puck comprising:

a main body having an inner cavity capable of receiving a second portion of said sprayer head; and a gripper assembly associated with said main body having first and second gripping elements movable toward and away from one another for releasably gripping one of said cap and said first portion of said sprayer head and first and second support members connected to said first and second gripping elements for movement between first and second positions, said first and second support members defining a shelf in said first position for supporting said cap when said cap is gripped by said first and second gripping elements and being movable to said second position by said second portion of said sprayer head when said first portion of said sprayer head is gripped by said first and second gripping elements to stabilize said second portion of said sprayer head within said main body, wherein said first gripping element comprises a first arm having at least one gripper member rotatably mounted thereon and said second gripping element comprises a second arm having at least one gripper member rotatably mounted thereon.

14. A puck as set forth in claim 13, wherein said first gripping element comprises two first gripper members and said second gripping element comprises two second gripper members.

15. A puck as set forth in claim 14, wherein said main body includes first and second bores through which said first and second arms extend.

16. A puck as set forth in claim 15, wherein said inner cavity is defined by an inner side wall portion and an inner base wall portion of said main body.

17. A method for threadedly mating a closure element to a container comprising the steps of:

gripping a closure element on its outer surface with gripper members;

rotating at least one of said gripper members to effect the rotation of said closure element;

moving at least one of said container and said gripper members with the gripped closure element so that said container and said rotating gripper member with the gripped closure element are moved toward one another; and, thereafter, engaging said container with said rotating closure element to threadedly mate said closure element with said container.

* * * * *

REEXAMINATION CERTIFICATE (3275th)

United States Patent [19]

Bliss

[11] B1 5,479,762

[45] Certificate Issued Jul. 15, 1997

[54] CARRIER PUCK

[75] Inventor: Gary S. Bliss, Beavercreek, Ohio

[73] Assignee: Dowbrands L.P., Indianapolis, Ind.

Reexamination Request:
No. 90/004,304, Jul. 22, 1996

Reexamination Certificate for:
Patent No.: 5,479,762
Issued: Jan. 2, 1996
Appl. No.: 239,018
Filed: May 6, 1994

[51] Int. Cl.⁶ ..................................................... B65B 7/28
[52] U.S. Cl. .............................. 53/490; 53/331.5; 53/317
[58] Field of Search .............................. 53/317, 331.5, 53/490, 334, 344, 354, 355, 356, 340; 279/22, 35, 106, 906

[56] References Cited

U.S. PATENT DOCUMENTS

| | | | |
|---|---|---|---|
| 3,852,941 | 12/1974 | Bross | 53/331.5 |
| 4,178,732 | 12/1979 | Pfleger | |
| 4,559,759 | 12/1985 | Herbert | 53/317 |
| 5,207,048 | 5/1993 | Wysocki | 53/331.5 |

FOREIGN PATENT DOCUMENTS

| | | |
|---|---|---|
| B-630331 | 10/1992 | Australia . |
| 0521581 | 1/1993 | European Pat. Off. . |
| 0562810 | 9/1993 | European Pat. Off. . |
| 2039856 | 8/1980 | United Kingdom . |

*Primary Examiner*—John Sipos

[57] ABSTRACT

A puck is provided for releasably gripping a closure element to be moved along a predetermined path and mated to a container. The puck includes a main body and a gripper assembly associated with the main body for releasably gripping the closure element. The gripper assembly comprises first and second opposing arms connected to the main body. The first arm has two first gripper members mounted thereto and the second arm has two second gripper members mounted thereto. The first and second arms are movable between a retracted position and a gripping position. The first gripper members are rotatable for effecting rotation of the closure element to permit the closure element to be mated to the container. The gripper assembly further includes first and second spring-biased support members connected to the first and second arms for movement between first and second positions. The first and second support members define a shelf when positioned in the first position for supporting the closure element when the closure element comprises a cap and is movable to the second position by the closure element when the closure element comprises a sprayer head.

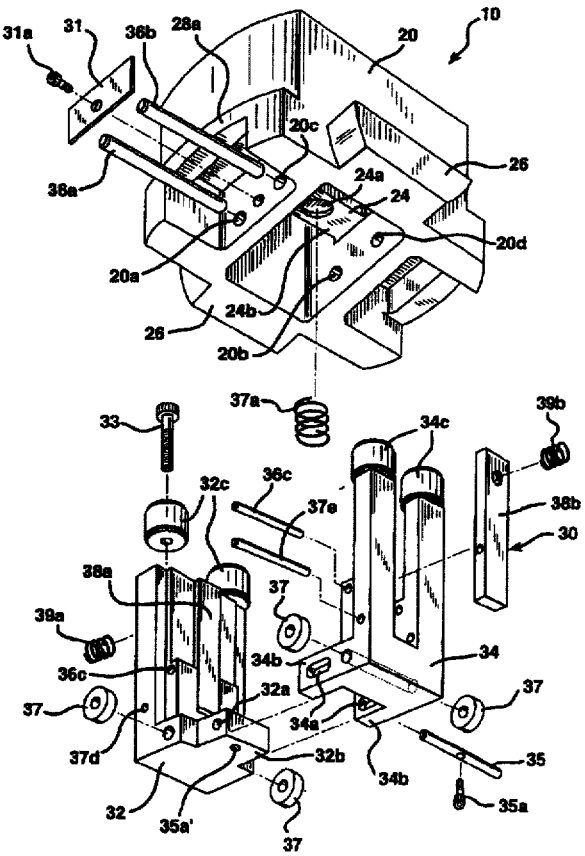

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16 is confirmed.

Claim 17 is cancelled.

* * * * *